(12) United States Patent
Zhang et al.

(10) Patent No.: US 11,546,303 B2
(45) Date of Patent: *Jan. 3, 2023

(54) AUTOMATIC ESTABLISHMENT OF NETWORK TUNNELS BY AN SDWAN CONTROLLER BASED ON GROUP AND ROLE ASSIGNMENTS OF NETWORK DEVICES

(71) Applicant: Fortinet, Inc., Sunnyvale, CA (US)

(72) Inventors: Wei Zhang, Campbell, CA (US); Shiji Li, Campbell, CA (US)

(73) Assignee: Fortinet, Inc., Sunnyvale, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 16/916,112

(22) Filed: Jun. 30, 2020

(65) Prior Publication Data

US 2021/0185013 A1 Jun. 17, 2021

Related U.S. Application Data

(63) Continuation of application No. 16/717,224, filed on Dec. 17, 2019.

(51) Int. Cl.
*H04L 29/00* (2006.01)
*H04L 9/40* (2022.01)
(Continued)

(52) U.S. Cl.
CPC .......... *H04L 63/0272* (2013.01); *H04L 45/50* (2013.01); *H04L 61/5014* (2022.05);
(Continued)

(58) Field of Classification Search
CPC . H04L 63/0272; H04L 45/50; H04L 61/2015; H04L 63/029; H04L 63/107; H04L 63/20; H04L 63/104; H04L 12/4641
See application file for complete search history.

(56) References Cited

U.S. PATENT DOCUMENTS

| 10,938,717 B1* | 3/2021 | Sundararajan | ...... H04L 47/2441 |
| 2020/0195557 A1* | 6/2020 | Duan | ................ H04L 12/4645 |

(Continued)

OTHER PUBLICATIONS

"FortiWAN Controller Administration Guide, Version 1.4.0", Nov. 21, 2018, 59 pages.

*Primary Examiner* — Brandon Hoffman
*Assistant Examiner* — Helai Salehi
(74) *Attorney, Agent, or Firm* — Law Office of Dorian Cartwright; Dorian Cartwright

(57) ABSTRACT

Systems and methods are described for automatically building up a VPN to facilitate full-mesh communication within a private network of an organization based on group and role settings of participating network devices. According to one embodiment, configuration information, including a group setting, indicating a group with which the particular network device is associated, and a role setting, specifying a role of the particular network device within the group as either a hub or an edge, is received by an SDWAN controller associated with the private network for each network device of the private network. Based on the configuration information, IPsec configuration information is determined for establishment of VPN links between a hub of each group and one or more edges of the group. Full-mesh communication among the groups is enabled by causing the hubs to set up IPsec tunnels between each pair of hubs based on the IPsec configuration information.

20 Claims, 13 Drawing Sheets

(51) Int. Cl.
*H04L 45/50* (2022.01)
*H04L 61/5014* (2022.01)

(52) U.S. Cl.
CPC .......... *H04L 63/029* (2013.01); *H04L 63/107* (2013.01); *H04L 63/20* (2013.01)

(56) References Cited

U.S. PATENT DOCUMENTS

2020/0413283 A1* 12/2020 Shen .................. H04L 41/0896
2021/0067442 A1* 3/2021 Sundararajan .......... H04L 45/64

* cited by examiner

530 ─┐

| PROFILE / HUB | | | | | | SUCCESS | | |
|---|---|---|---|---|---|---|---|---|
| GENERAL  NETWORK  BUSINESS  FIREWALL | | | | | | | | |
| ▾ WAN | | | | | | | | |
| + ADD  RELOAD | | | | | | | | |
| INTERFACE | VLAN | WAN TYPE | MTU | MODE | BANDWIDTH PARCENTAGE | COST LEVEL | USE NAT POOL | |
| PORT1 | 0 | MPLS | 1500 | DHCP | IN: 10% Out: 10% | HIGH | — | |
| PORT2 | 0 | INTERNET | 1500 | DHCP | IN: 10% Out: 10% | LOW | — | |
| PORT3 | 0 | INTERNET | 1500 | STATIC | IN: 1% Out: 1% | MEDIUM | — | |
| ▾ LAN | | | | | | | | |
| + ADD  RELOAD | | | | | | | | |
| INTERFACE | VLAN | IP ADDRESS AUTO ASSIGN | | IP POOL | PREFIX SIZE | DHCP SERVER/ RELAY | DHCP POOL SIZE | |
| PORT4 | 0 | ✓ | | INTERNAL_POOL | 24 | SERVER DHCP | 100 | |

| CONFIGURATION ▾   DEVICE   PROFILE   SHARE RESOURCE   GLOBAL ROUTING | |
|---|---|
| RELOAD | |
| SUBNET | NEXT HOP |
| 192.168.0.0/24 | US_HUB:DIRECT CONNECTED PORT4 |
| 192.168.1.0/24 | US_EDGE:DIRECT CONNECTED PORT4 |
| 192.168.4.0/24 | CN_HUB:DIRECT CONNECTED PORT4 |
| 192.168.5.0/24 | CN_EDGE:DIRECT CONNECTED PORT4 |
| 192.168.6.0/24 | EU_HUB:DIRECT CONNECTED PORT4 |
| 192.168.7.0/24 | EU_EDGE:DIRECT CONNECTED PORT4 |

| Status | Name | Member | IP/Netmask | Type | Access |
|---|---|---|---|---|---|
| Physical(10) | | | | | |
| ● | Port3 | | 0.0.0.0 0.0.0.0 | Physical Interface | |
| ● | Port4 | | 192.168.5.1 255.255.255.0 | Physical Interface | Ping HTTPS SSH SNMP HTTP Telnet |
| ● | Port5 | | 0.0.0.0 0.0.0.0 | Physical Interface | Ping HTTPS SSH SNMP HTTP Telnet |
| ● | Port6 | | 0.0.0.0 0.0.0.0 | Physical Interface | Ping HTTPS SSH SNMP HTTP Telnet |
| ● | Port7 | | 0.0.0.0 0.0.0.0 | Physical Interface | Ping HTTPS SSH SNMP HTTP Telnet |
| ● | Port8 | | 0.0.0.0 0.0.0.0 | Physical Interface | Ping HTTPS SSH SNMP HTTP Telnet |
| ● | Port9 | | 0.0.0.0 0.0.0.0 | Physical Interface | Ping HTTPS SSH SNMP HTTP Telnet |
| ● | Port10 | | 0.0.0.0 0.0.0.0 | Physical Interface | Ping HTTPS SSH SNMP HTTP Telnet |
| SD-WAN Interface(5) | | | | | |
| | SD-WAN | | | SD-WAN Interface | |
| ● | | Port1 | 10.200.102.3 255.255.255.0 | Physical Interface | Ping HTTPS SSH HTTP FMG-Access |
| ● | | Port2 | 192.200.202.3 255.255.255.0 | Physical Interface | Ping HTTPS SSH SNMP HTTP Telnet |
| | | 1 | 169.254.0.0 255.255.255 | Tunnel Interface | Ping HTTPS SSH SNMP HTTP Telnet |
| | | 2 | 169.254.0.2 255.255.255 | Physical Interface | |

SD-WAN Interface Members

| Interface | ⓘ | Port1 ▼ | ✕ |
| Gateway | | 10.200.102.1 | |
| Status | | ● Enable  ● Disable | |

| Interface | ⓘ | Port2 ▼ | ✕ |
| Gateway | | 192.200.202.1 | |
| Status | | ● Enable  ● Disable | |

| Interface | ⓘ | 1 ▼ | ✕ |
| Gateway | | 0.0.0.0 | |
| Status | | ● Enable  ● Disable | |

| Interface | ⓘ | 2 ▼ | ✕ |
| Gateway | | 0.0.0.0 | |
| Status | | ● Enable  ● Disable | |

| NAME | DETECT SERVER | PACKET LOSS | LATENCY | JITTER |
|---|---|---|---|---|
| 1 | 169.254.0.1 | 1: 0.00%<br>2: 0.00% | 1: 0.42ms<br>2: 0.51ms | 1: 0.11ms<br>2: 0.12ms |
| SALESFORECS_WEB | WWW.SALESFORCE.COM | PORT1: 0.00%<br>PORT2: 0.00%<br>1: 0.00%<br>2: 0.00% | Port1: 55.44ms<br>Port2: 55.36ms<br>1: 56.23ms<br>2: 55.66ms | Port1: 0.31ms<br>Port2: 0.24ms<br>1: 1.46ms<br>2: 0.36ms |
| MICROSOFT_OFFICE 365 | WWW.MICROSOFT.COM | PORT1: 0.00%<br>PORT2: 0.00%<br>1: 0.00%<br>2: 0.00% | Port1: 19.48ms<br>Port2: 19.71ms<br>1: 19.86ms<br>2: 20.20ms | Port1: 0.46ms<br>Port2: 0.54ms<br>1: 0.45ms<br>2: 1.13ms |

| ADDRESS 21 | | |
|---|---|---|
| DEVICE_1_PORT4 | SUBNET | 192.168.4.0/24 |
| DEVICE_2_PORT4 | SUBNET | 192.168.5.0/24 |
| DEVICE_3_PORT4 | SUBNET | 192.168.6.0/24 |
| DEVICE_4_PORT4 | SUBNET | 192.168.7.0/24 |
| DEVICE_5_PORT4 | SUBNET | 192.168.0.0/24 |
| DEVICE_6_PORT4 | SUBNET | 192.168.1.0/24 |

| Address Group 12 | | |
|---|---|---|
| Device_1 | Address Group | Device_1_port4 |
| Device_2 | Address Group | Device_2_port4 |
| Device_3 | Address Group | Device_3_port4 |
| Device_4 | Address Group | Device_4_port4 |
| Device_5 | Address Group | Device_5_port4 |
| Device_6 | Address Group | Device_6_port4 |

| | | |
|---|---|---|
| Group_All | Address Group | Device_2_port4 |
| | | Device_1_port4 |
| | | Device_3_port4 |
| | | Device_4_port4 |
| | | Device_5_port4 |
| | | Device_6_port4 |
| Group_CN | Address Group | Device_2_port4 |
| | | Device_1_port4 |
| Group_EU | Address Group | Device_3_port4 |
| | | Device_4_port4 |
| Group_US | Address Group | Device_5_port4 |
| | | Device_6_port4 |

FIG. 6F

AUTOMATIC ESTABLISHMENT OF NETWORK TUNNELS BY AN SDWAN CONTROLLER BASED ON GROUP AND ROLE ASSIGNMENTS OF NETWORK DEVICES

CROSS-REFERENCE TO RELATED APPLICATIONS

This application is a continuation of U.S. patent application Ser. No. 16/717,224 filed on Dec. 17, 2019, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019-2020, Fortinet, Inc.

BACKGROUND

Field

Embodiments of the present invention generally relate to the field of Software-Defined Networking (SDN) and Virtual Private Networks (VPNs). In particular, embodiments of the present invention relate to a Software-Defined Wide Area Network SDWAN controller that makes use of group and role settings associated with networking devices of an enterprise to automatically define full-mesh overly links between hubs of groups and hub-spoke connections between a hub and edges within each group.

Description of the Related Art

In network architectures, network resources such as gateway devices are used to build up a network, which connects network devices that are implemented at different geographical locations of an organization. A full-mesh network topology allows every network device in a network to connect to each of the other network devices implemented in the same network, thereby enabling management of high amounts of traffic as multiple network devices can transmit data simultaneously. Organizations or companies require full-mesh network communication so that network devices implemented at one branch or location of the organization can access network devices implemented at other branches or locations.

However, full-mesh network communication between all network devices of an organization is not scalable because these devices may not have sufficient resources to support several Virtual Private Network (VPN) tunnels simultaneously. With implementation of robust resources, cost to implement the network topology becomes very high. Further, manually setting up a VPN is time-consuming and error-prone, which makes managing the network topology very difficult.

In view of the foregoing, there is a need for further improvement in the area of developing effective approaches for implementing full-mesh network communications among network devices.

SUMMARY

Systems and methods are described for automatically building up a VPN to facilitate full-mesh communication within an organization based on group and role settings of participating network devices. According to one embodiment, configuration information for each network device of multiple network devices of a private network of the organization is received by a Software-Defined Wide Area Network (SDWAN) controller associated with the private network. The configuration information for a particular network device includes a group setting indicative of a group of multiple groups with which the particular network device is associated and a role setting, specifying a role of the particular network device within the group as either a hub or an edge. A first group of the multiple groups includes a first subset of the multiple network devices located at a first physical site of the organization and a second group of the multiple groups includes a second subset of the multiple network devices located at a second physical site of the organization. Based on the received configuration information, Internet Protocol (IP) security (IPsec) configuration information is determined by the SDWAN controller for establishment of Virtual Private Network (VPN) links between a hub of each group and one or more edges of the group. Full-mesh communication among the groups is enabled by the SDWAN controller causing the hubs of the groups to set up IPsec tunnels between each pair of the hubs in accordance with the determined IPsec configuration information by pushing the determined IPsec configuration information to the hubs.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 5A-E illustrate exemplary representations at a management device in accordance with an embodiment of the present invention.

FIGS. 6A-F illustrate exemplary representations at a network device in accordance with an embodiment of the present invention.

DETAILED DESCRIPTION

Figure 1A:
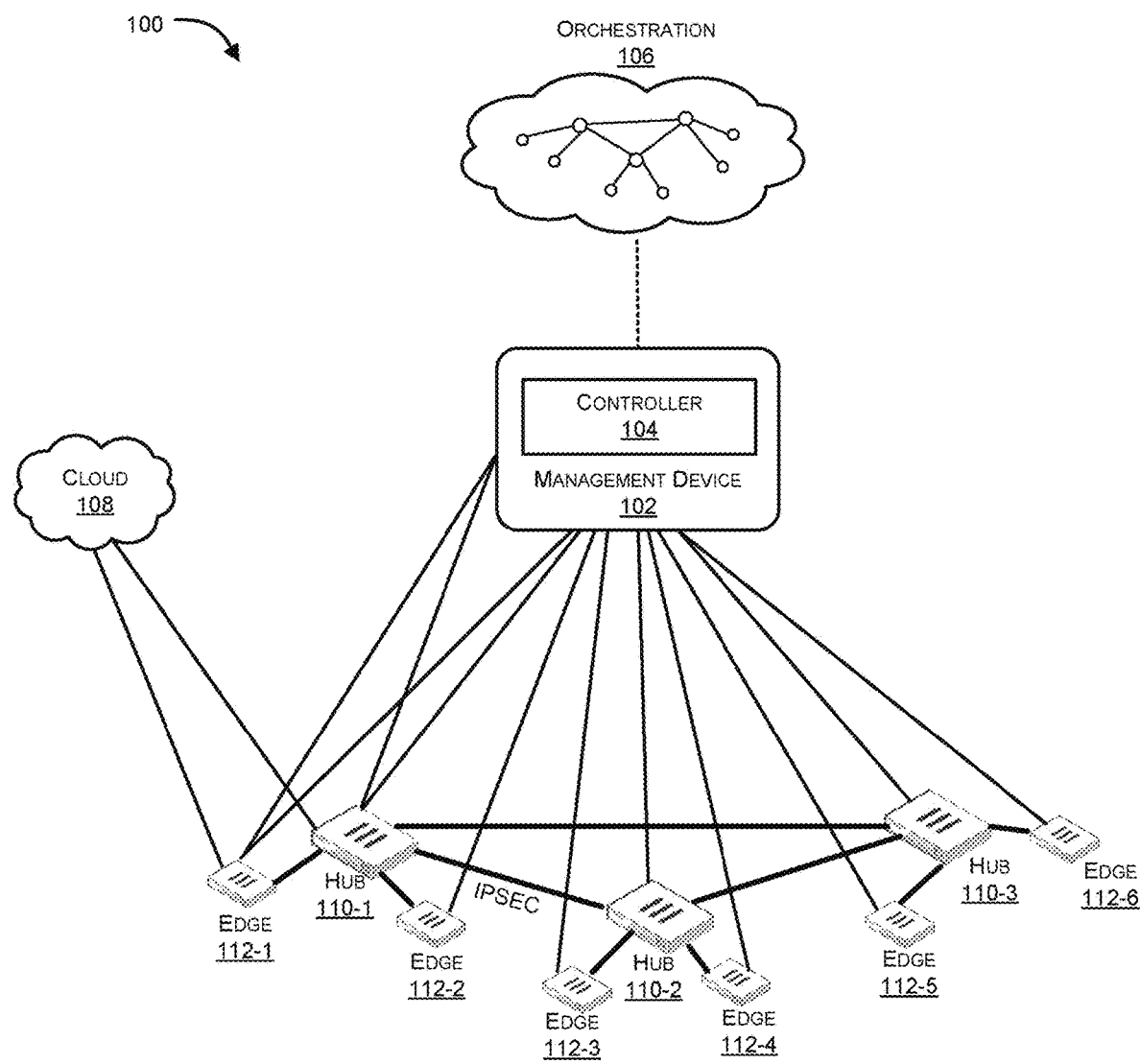
FIGS. 1A-B illustrate network architectures in which aspects of the present invention can be implemented in accordance with an embodiment of the present invention.

Systems and methods are described for automatically building up a VPN to facilitate full-mesh communication within an enterprise based on group and role settings of the participating network devices. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/ machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "underlay link" generally refers to a raw transport associated with a physical connection for creating a one to one relationship between underlay interfaces and network devices of a private network. According to one embodiment, underlay links are data links rented or bought from an Internet Service Provider (ISP) and may include Internet, Multi-Protocol Label Switching (MPLS), and third, fourth, or fifth generation of wireless mobile telecommunications technology (3G, 4G, or 5G) or Long Term Evolution (LTE) links.

The phrase "overlay link" generally refers to a logical or virtual tunnel built on top of the underlay links. According to one embodiment, the overly links may be used to create a one-to-many relationship between a network device and overlay interfaces of a private network. In one embodiment, overlay links are used to form an IPSec secured connection between two SDWAN devices (e.g., network security devices operating as hubs).

The term "hub" generally refers to a network device that acts as an SDWAN gateway and creates connections with hubs of multiple groups using tunnels (e.g., IPSec tunnels). Further, the hub of a group can create connections with one or more edges of the group.

The term "edge" generally refers to a network device that provides an entry point into a network. In embodiments described herein, network devices assigned the role of an edge may provide an entry point to an SDWAN on behalf of one or more client devices. Non-limiting examples of edge devices include edge server appliances, WAN load balancing devices, switches, routers, gateways and network security devices. Edge server appliances and/or WAN load balancing devices may be deployed between enterprise intranets (LANs) and the Internet (WAN) and may manage multiple WAN links to delivery bandwidth aggregation and WAN fault tolerance for inbound and outbound traffic. An example of an edge server appliance or a WAN load balancing device is the FORTIWAN family of load balancing devices.

The term "group" generally refers to a collection of network devices located in a particular geographical region or location. Each group consists of multiple network devices, where only one of the network devices is assigned a role of a hub, and the remaining network devices are assigned a role of edge. Further, in one embodiment, each network device that will participate in an SDWAN includes a group setting that identifies which of multiple groups it is a member of.

The term "role" generally refers to the function assumed or part to be played by a network device that is participating in an SDWAN. According to various embodiments described herein, a network device may be assigned to operate as a hub or an edge of a group.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances and FORTIWAN family of SDWAN controllers), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrases "network security device" or "security device" generally refer to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, anti-spam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like. According to one embodiment, a management appliance associated with an enterprise network that manages the network security devices associated with the enterprise network incorporates the SDWAN controller functionality described herein and the network security devices operate as edge devices and/or hub devices in accordance with roles assigned to them by the management appliance.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Systems and methods are described for automatically building up a VPN to facilitate full-mesh communication within an enterprise based on group and role settings of the participating network devices. According to various aspects of the present disclosure, a Software-Defined Wide Area Network (SDWAN) controller associated with a private network receives configuration information for each network device of the private network, wherein the configuration information for a particular network device includes a group setting and a role setting. The group setting indicates a group with which the particular network device is associated and the role setting specifies a role of the particular network device within the group as either a hub or an edge. Further, based on the received configuration information for each group the SDWAN controller determines Internet Protocol (IP) security (IPsec) configuration information for generating Virtual Private Network (VPN) links. The VPN links are generated between a hub of the group and one or more edges of the group and between corresponding hubs to enable full-mesh communication among the groups. Furthermore, the SDWAN controller directs the network devices to set up IPsec tunnels, in accordance with the determined IPsec configuration information by pushing the determined IPsec configuration information to each of the network devices.

Figure 1B:
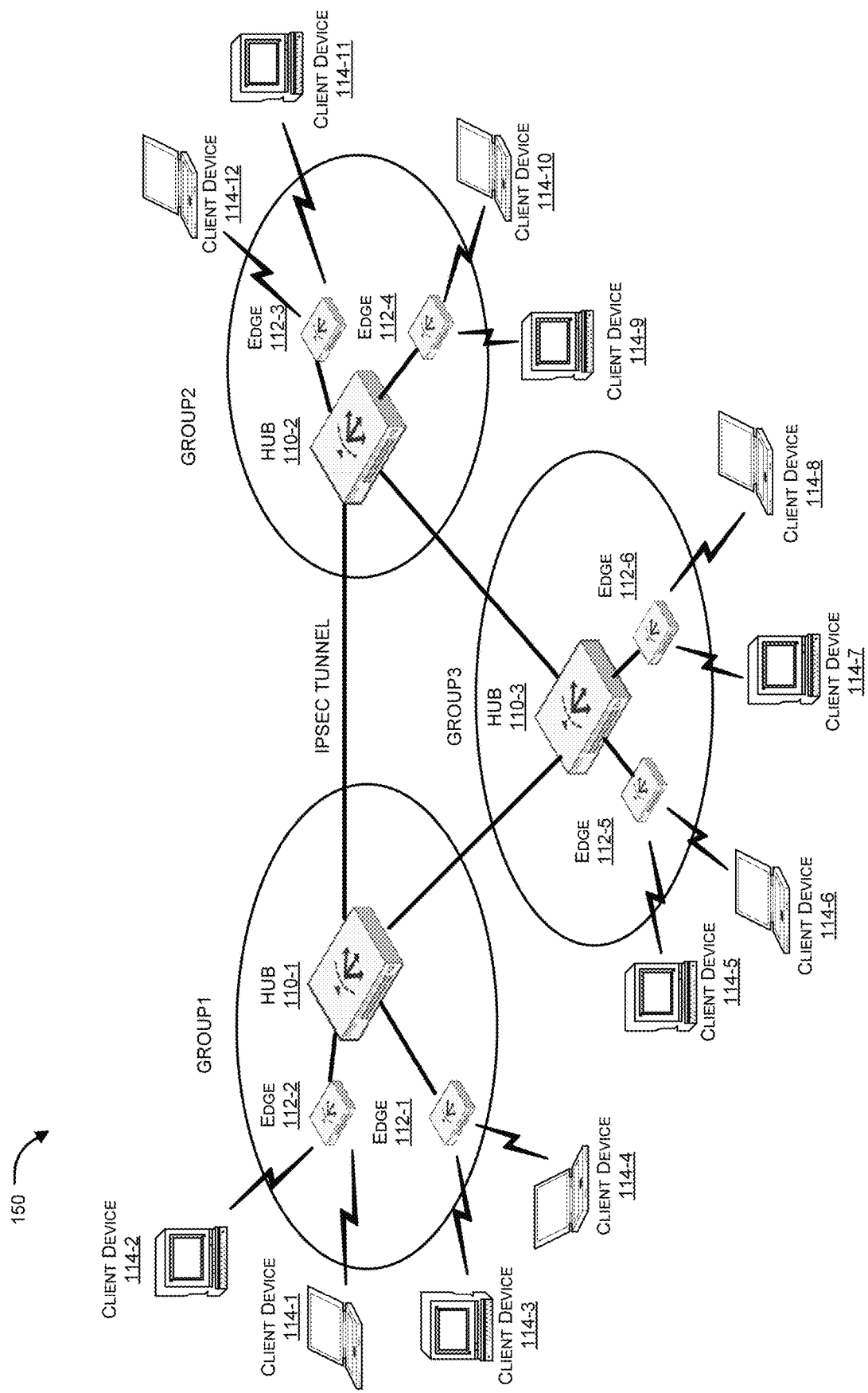

FIGS. 1A-B illustrate network architectures 100 and 150 in which aspects of the present invention can be implemented in accordance with an embodiment of the present invention. In network architecture 100, an SDWAN is illustrated. An orchestration layer 106 may be used to perform various automation tasks to reduce operational workload of configuration, troubleshooting and network device management for the SDWAN. A controller 104 (also referred to as SDWAN controller 104, hereinafter) associated with a private network is provided and is communicatively coupled with or integrated within management device 102, which drives centralized management and orchestration for facilitating implementation of the SDWAN. In one embodiment, the management device 102 is a management appliance associated with an enterprise network that manages the network security devices associated with the enterprise network and the network security devices operate as edge devices and/or hub devices in accordance with roles assigned to them by the management appliance.

According to one embodiment, controller 104 automatically builds full-mesh overlay links to connect all the network devices participating in the SDWAN. In an embodiment, management device 102 can be a network appliance that is part of a security fabric. In another embodiment, management device 102 can be implemented through a cloud environment 108, which can be a private cloud or a public cloud environment. Regardless of location, management device 102 can maintain connectivity with each of network devices of the SDWAN. In one embodiment, in addition to managing the network security devices associated with the enterprise network, management device 102 may also perform various functions relating to management of the SDWAN. Non-limiting examples of such functions include monitoring performance Service-Level Agreements (SLAs) of the participating network devices and determining security configurations.

Further, multiple network devices (e.g., switches, routers, gateways, and/or network security devices), which may represent consumer premises equipment (CPE) of the SDWAN, are shown and each network device of the multiple network devices is assigned a specific role as either a hub or an edge (e.g., by the management device 102 as specified by a network administrator). In the context of the present example, there are multiple edge devices 112-1, 112-2, 112-3 . . . 112-6 and multiple hub devices 110-1, 110-2, 110-3. Each of the one or more edge devices are connected to the hub device of a group. In an example, hub device 110-1 can be connected to edge devices 112-1 and 112-2, hub device 110-2 can be connected to edge devices 112-3 and 112-4, and hub device 110-3 can be connected to edge devices 112-5 and 112-6. Further, a hub device of a group can connect to one or more additional hub devices of other respective groups thereby forming a full mesh network. The hub devices of different groups can be connected using IPsec tunnels that can be used to securely transport packets between hubs, edges, or to cloud 108. Management device 108 supports numerous connections for IPsec tunnels and SDWAN, from common hub and spoke and partial mesh, to full mesh VPN architectures. The IPsec tunnels can be established using either or a combination of Multiprotocol Label Switching (MPLS) links and Internet links.

In an embodiment, when a network device is powered on, the network device receives a dynamically assigned Internet Protocol (IP) address from cloud 108. The dynamically assigned IP address is used to establish a network connection of the network device with controller 104 configured within management device 102. In one embodiment, the IP address can be assigned to the network device by cloud 108 using a Dynamic Host Configuration Protocol (DHCP). Also, the network device can be pre-configured with knowledge regarding the IP address of controller 104 or knowledge regarding how to obtain such information (e.g., from the cloud 108). Further, responsive to establishment of a network connection of the network device with controller 104, controller 104 determines IPsec configuration information based on a WAN port IP address received from the network device. The IPsec configuration information can be used to generate VPN links between a hub of the group and one or more edges of the group and between corresponding hubs of various groups to enable full mesh communication among the various groups. Furthermore, controller 104 can push configuration templates to the connected network devices for security and SDWAN functionality. Controller 104 can direct the multiple network devices to set up IP tunnels in accordance with the determined IPsec configuration information. The directions can be provided by pushing the determined IPsec configuration information to each of the multiple network devices. Thereafter, controller 104 can direct the multiple network devices of the SDWAN to build up a VPN. Additionally, the multiple network devices can be pre-configured with information regarding SDWAN controller 104 for establishing the network connection.

According to representation 150, the network devices of the SDWAN are associated with groups (e.g., group 1, group 2, and group 3). A group generally refers to a collection of network devices located in a particular geographical region or location. For example, the network devices associated with group 1 may be located at a first physical site of an enterprise, the network devices associated with group 2 may be located at a second physical site of the enterprise, and the network devices associated with group 3 may be located at a third physical site of the enterprise.

As illustrated, each group has a network device that is assigned the role of a hub and the remaining network devices are assigned the roles of an edge. The network device assigned the role of the hub in a group can connect to the network devices assigned the role of hub in other groups via IPsec tunnels. Further, each of the network devices assigned the role of an edge in a group can connect to the network device assigned the role of the hub in the respective group via VPN links. As an example, in group 1, hub 110-1 is connected to two edge devices 112-1 and 112-2 via the VPN links, in group 2, hub 110-2 is connected to two edge devices 112-3 and 112-4 via the VPN links, and in group 3, hub 110-3 is connected to two edge devices 112- and 112-6 via the VPN links. Further, hub 110-1 of group 1, hub 110-2 of group 2 and hub 110-3 of group 3 are connected to each other using IPsec tunnels. Additionally, as shown, the edge device of each group may represent the point of connection to the SDWAN for one or more client devices. As an example, for group 1—edge device 112-2 is connected to two client devices 114-1 and 114-2, and edge device 112-2 is connected to two client devices 114-3 and 114-4. The client devices can be may include, but are not limited to, personal computers, smart devices, web-enabled devices, hand-held devices, laptops, mobile phones and the like, to enable interaction with other devices connected to the SDWAN.

Figure 2:
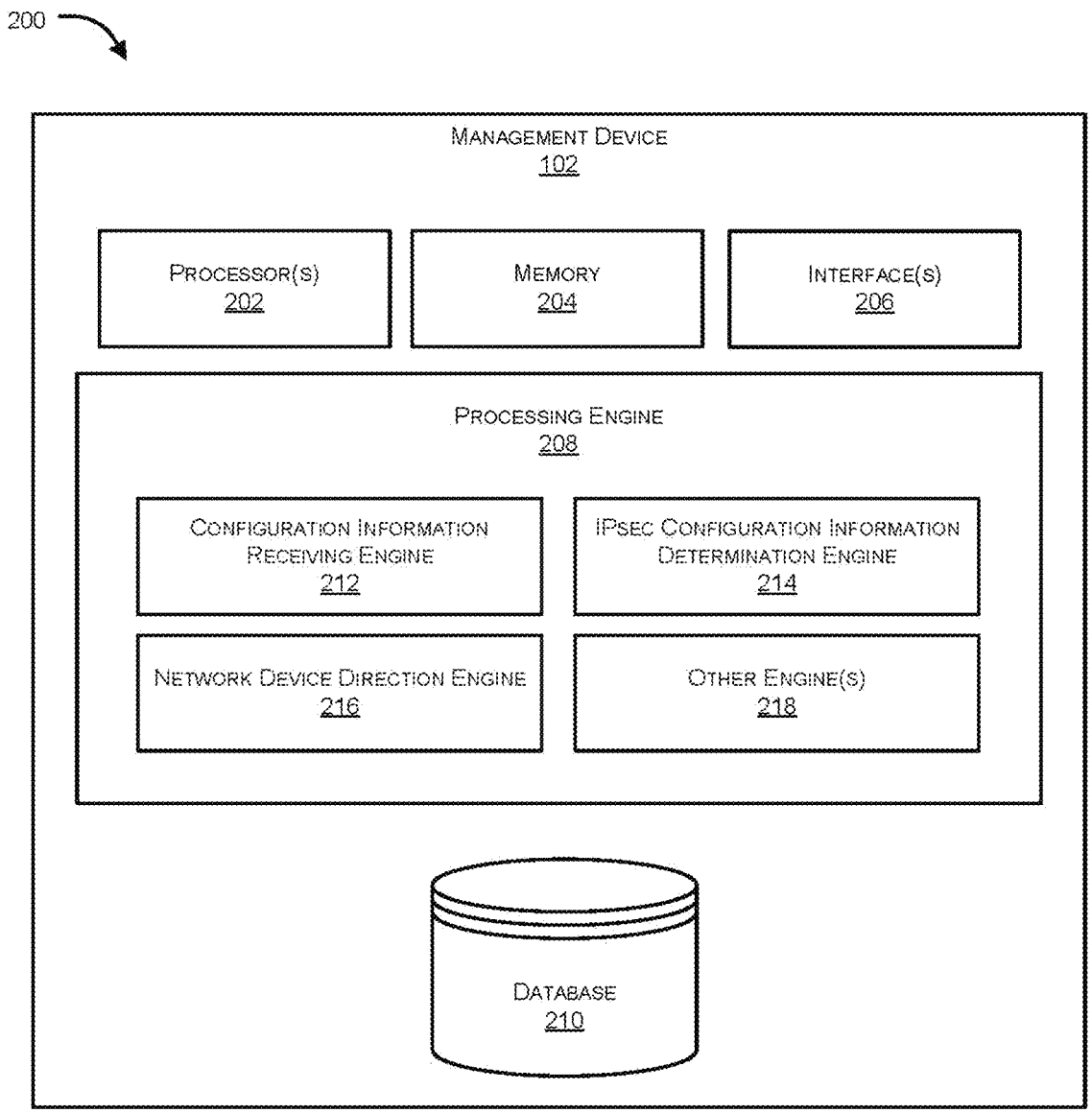
FIG. 2 is a block diagram illustrating functional components of a management device in accordance with an embodiment of the present invention.

FIG. 2 is a block diagram 200 illustrating functional components of a management device 102 in accordance with an embodiment of the present invention. As noted above, in one embodiment, the management device 102 is a management appliance associated with an enterprise network that manages the network security devices associated with the enterprise network. In one embodiment, network security devices operate as edge devices and/or hub devices in accordance with roles assigned to them by the management device 102 (e.g., as specified by a network administrator). In embodiments described herein, the management device 102 also simplifies the task of establishing full-mesh IPSec tunnels between those network devices designated as hubs and establishing tunnels between the hub devices of a group and their associated edge devices. According to one embodiment, the controller implemented within the management device 102 automatically maintains intranet routes based on the group and role settings described herein. In this manner, the network administrator is able to simply uses the group or CPE device name to configure SDWAN route policy.

In the context of the present example, management device 102 can include one or more processor(s) 202. Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of the management device 102. Memory 204 can store one or more computer-readable instructions or routines, which may be fetched and executed to create or share the data units over a network service. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

Management device 102 can also include one or more Interface(s) 206. Interface(s) 206 may include a variety of interfaces, for example, interfaces for data input and output devices, referred to as I/O devices, storage devices, and the like. Interface(s) 206 may facilitate communication of management device 102 with various devices coupled to management device 102. Interface(s) 206 may also provide a communication pathway for one or more components of management device 102. Examples of such components include, but are not limited to, processing engine(s) 208 and database 210.

Processing engine(s) 208 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) 208 may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, management device 102 can include the machine-readable storage medium storing the instructions and the processing resource to execute the instructions, or the machine-readable storage medium may be separate but accessible to management device 102 and the processing resource. In other examples, processing engine(s) 208 may be implemented by electronic circuitry. Database 210 can include data that is either stored or generated as a result of functionalities implemented by any of the components of processing engine(s) 208.

In an example, processing engine(s) 208 can include a configuration information receiving engine 212, an IPSec configuration information determination engine 214, a network device direction engine 216, and other engine(s) 218. Other engine(s) 218 can implement functionalities that supplement applications or functions performed by management device 102 or processing engine(s) 208.

According to an embodiment, configuration information receiving engine 212 can receive configuration information for each of the network device of a private network that will participate in an SDWAN. The configuration information can be received by a controller associated with the private network. The configuration information for a particular network can include a group setting and a role setting. The group setting can indicate a group with which the particular network device is associated. The role setting can specify a role for the particular network device within the group as either a hub or an edge.

According to an embodiment, IPsec configuration information determination engine 214 can determine IPsec configuration information for generating VPN links between a hub of the group and one or more edges of the group and between corresponding hubs of various groups to enable full-mesh communication among the various groups. Based on the received configuration information for each of the group, IPsec configuration information determination engine 214 can determine the IPsec configuration information. Each of the group further includes a cluster of a subset of multiple network devices, which are located in a particular geographical location. The network devices can be implemented as CPE. Further, IPsec configuration information determination engine 214 can determine IPsec configuration information based on a WAN port IP address received from the network device on establishment of the network connection with the controller. The IP address can be assigned using a Dynamic Host Configuration Protocol (DHCP). Furthermore, when a network devices is powered on, the network device can receive a dynamically assigned IP address from cloud to establish a network connection with the controller.

According to an embodiment, a network device direction engine 216 can direct, the various network devices to set up IPsec tunnels. The IPsec tunnels can be set up in accordance with the determined IPsec configuration information by pushing the determined IPsec configuration information to each of the various network devices. The network devices can build up a VPN in response to the directions received from network device direction engine 216. Additionally, the IPsec tunnels can be established using any or a combination of Multiprotocol Label Switching (MPLS) links and Internet links.

Figure 3:
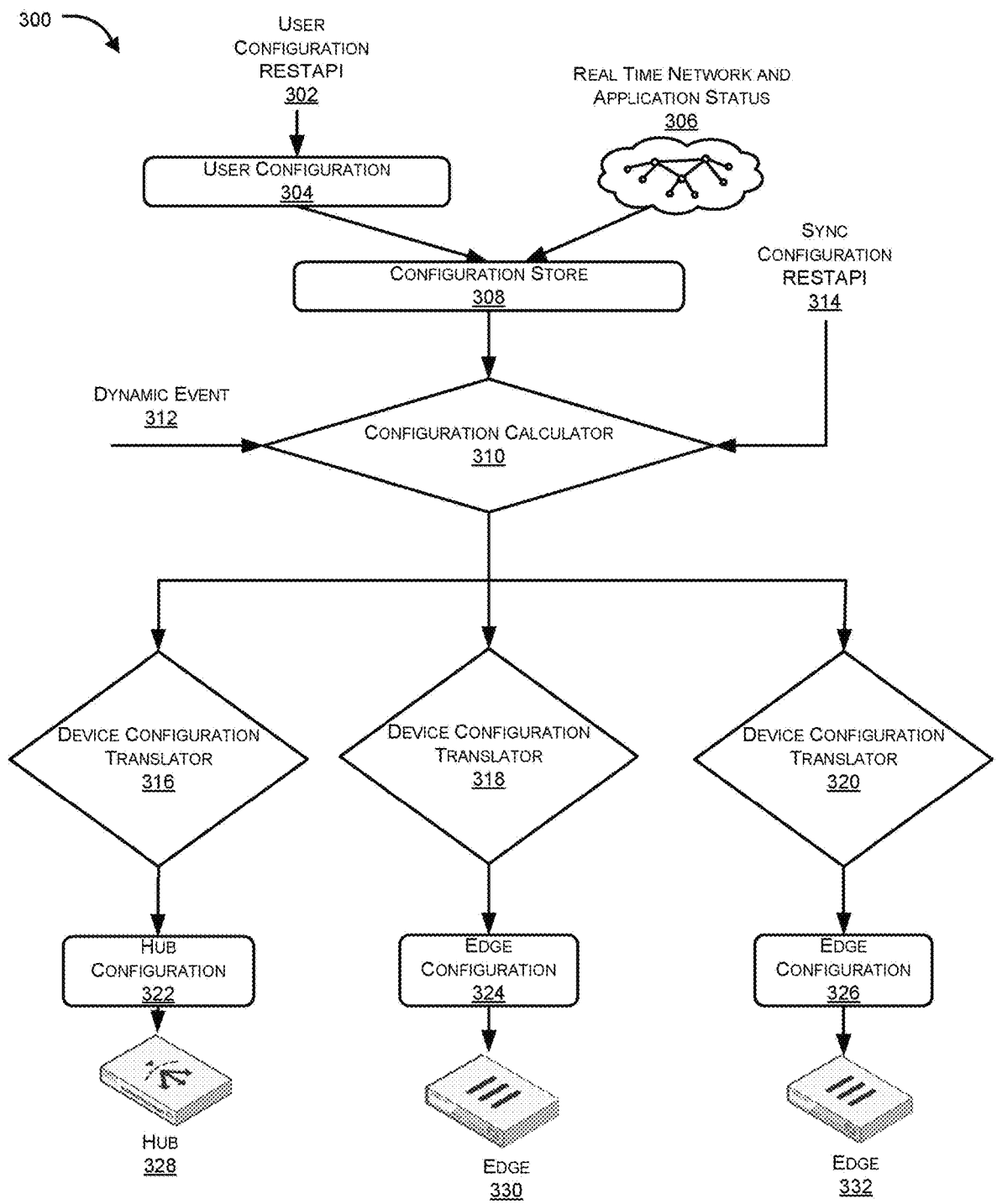
FIG. 3 is a block diagram illustrating workflow of an SDWAN controller in accordance with an embodiment of the present invention.

FIG. 3 is a block diagram 300 illustrating workflow of an SDWAN controller in accordance with an embodiment of the present invention. At block 302, a user configuration API that conforms to the Representational State Transfer (REST) architectural constraints, referred to herein as a RESTful API or a RESTAPI, is provided through which user configurations can be received at block 304. At block 306, a real-time network and application status is determined for the SDWAN. The determined real-time network and application status at block 306 and the user configuration received via the RESTAPI are provided as input to a configuration store at block 308. At block 310, calculation of configuration parameters for the network devices is performed. According to one embodiment, for supporting a true plug and play concept, the network devices that join the SDWAN can be configured based on parameters determined by configuration calculator at block 310.

In one embodiment, to facilitate configuration calculation, the SDWAN controller can automatically maintain intranet route(s) based on the determined group and role settings for the network devices, so that the network devices can simply use the determined group and role settings to configure a route policy. In the context of the present example, configuration calculation 310 is triggered by a dynamic event 312 and/or via a synchronization configuration RESTAPI 314. Non-limiting examples of dynamic events include:

1. Hub 328 WAN port DHCP IP change
2. Hub 328 IPSec tunnel to another Hub down
3. Hub 328 learns a dynamic route from another router Sync configuration RESTAPI 314 may be triggered by a user and can include a parameter identifying the device for which the user wants to sync the configuration.

To determine the configuration information for the network device, a network device configuration translation can be performed at blocks 316, 318 and 320. For example, in one embodiment, a device configuration translator can be provided for each of the various different types and versions of edge and hub devices expected to be encountered. In the context of the present example, device configuration translator 316 is used to translate the configuration output by the configuration calculator 310 to a native configuration understood by hub 328. Similarly, device configuration translators 318 and 320 are used to translate the configuration output by the configuration calculator 310 to native configurations understood by edge devices 330 and 332, respectively.

Figure 4:
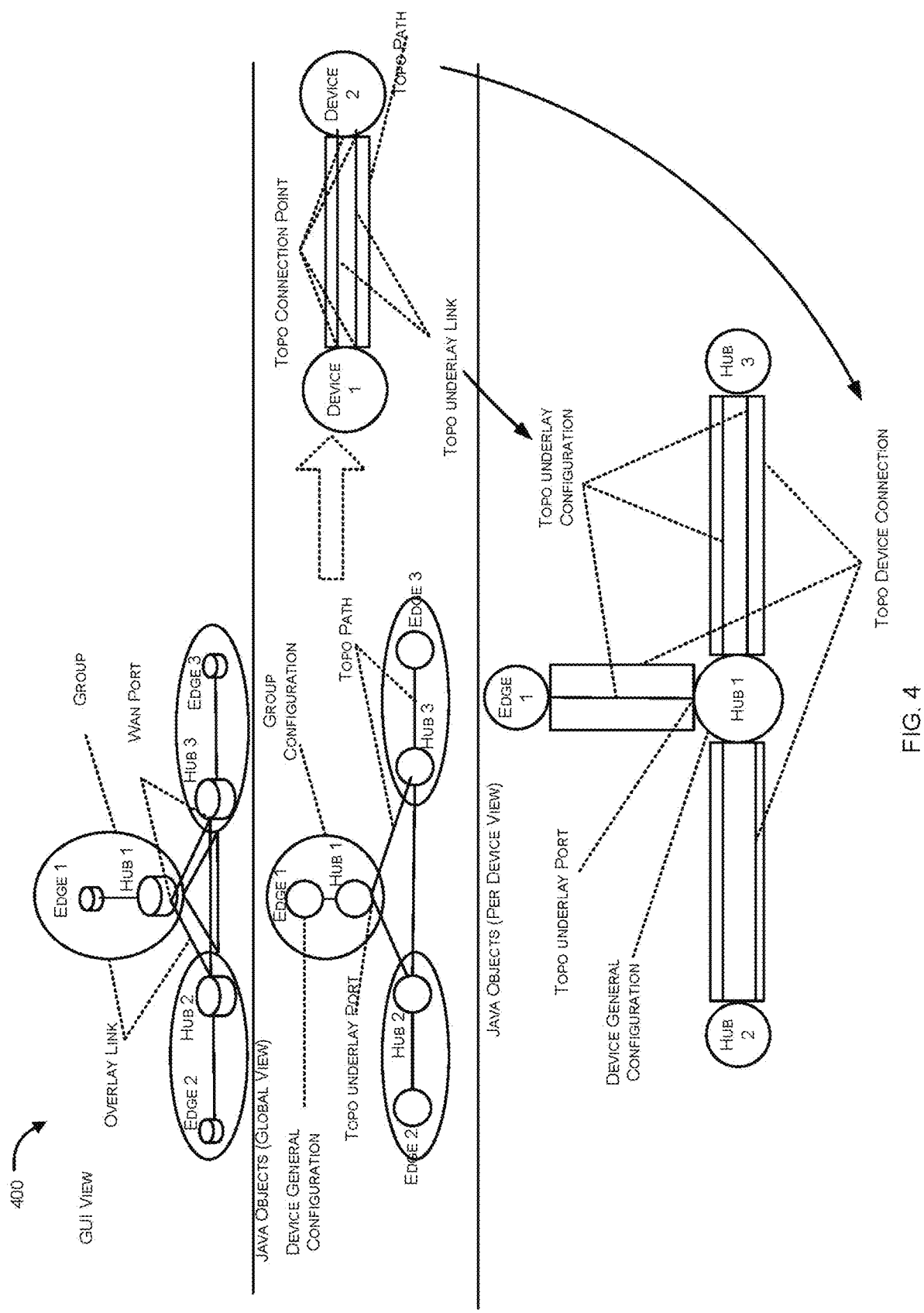
FIG. 4 is a block diagram illustrating an exemplary configuration model to establish network tunnels in accordance with an embodiment of the present invention.
Figure 5A:
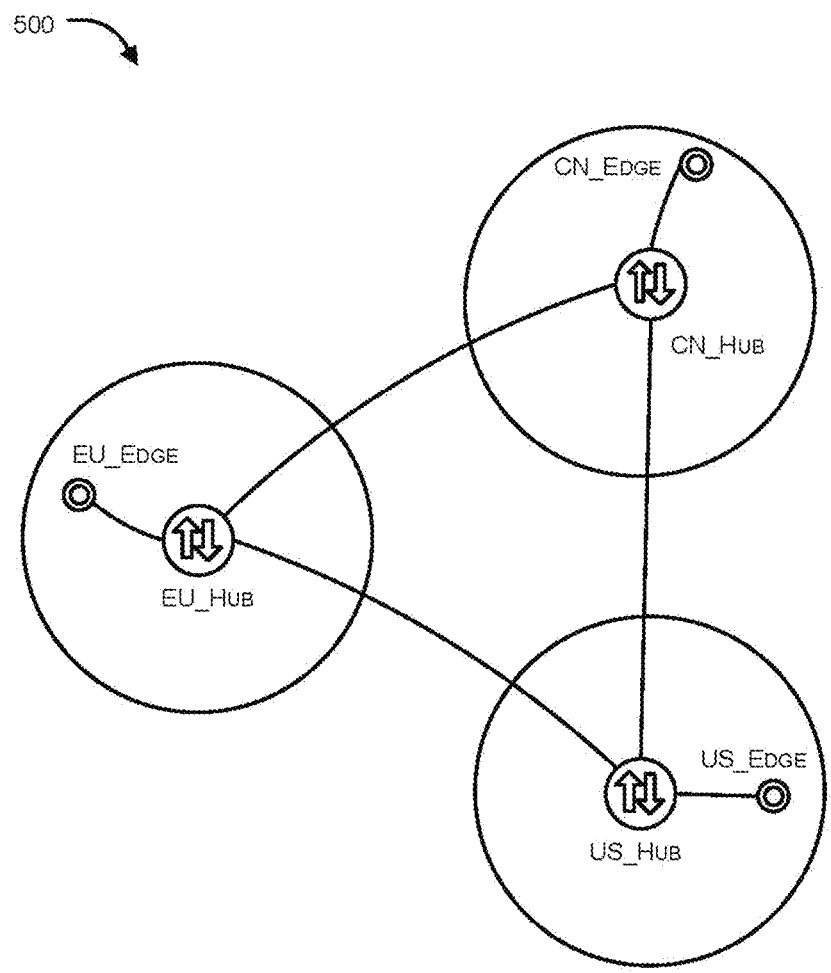
Figure 5B:
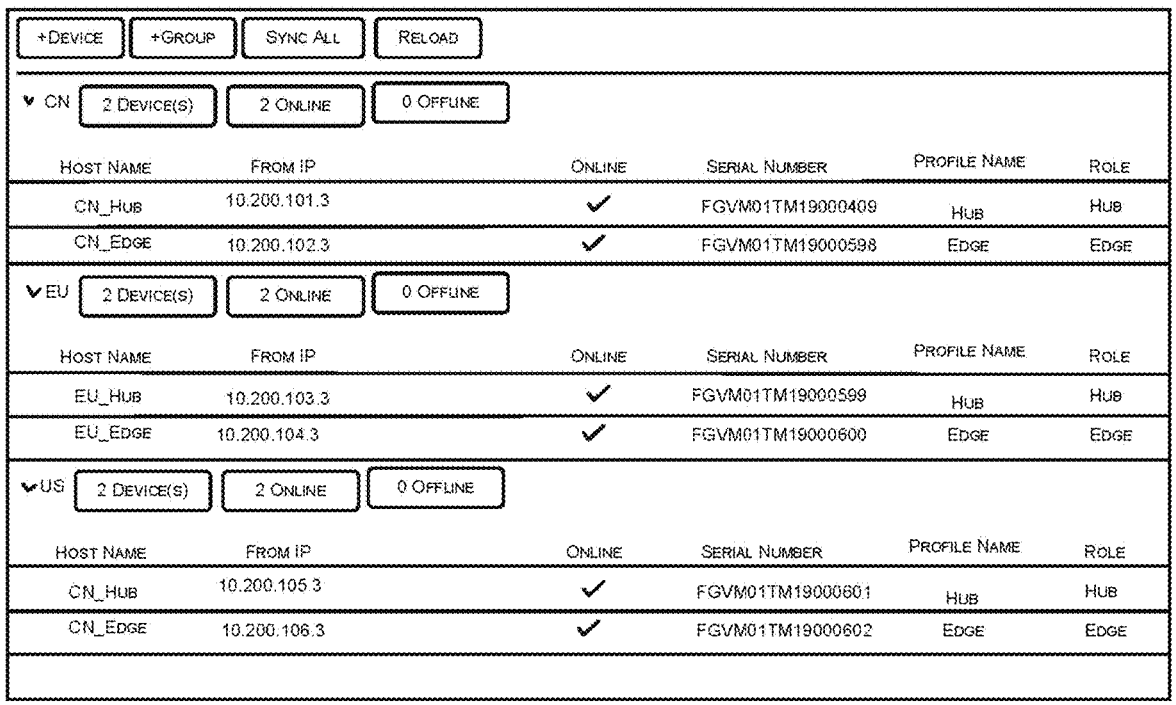
Figure 5C:
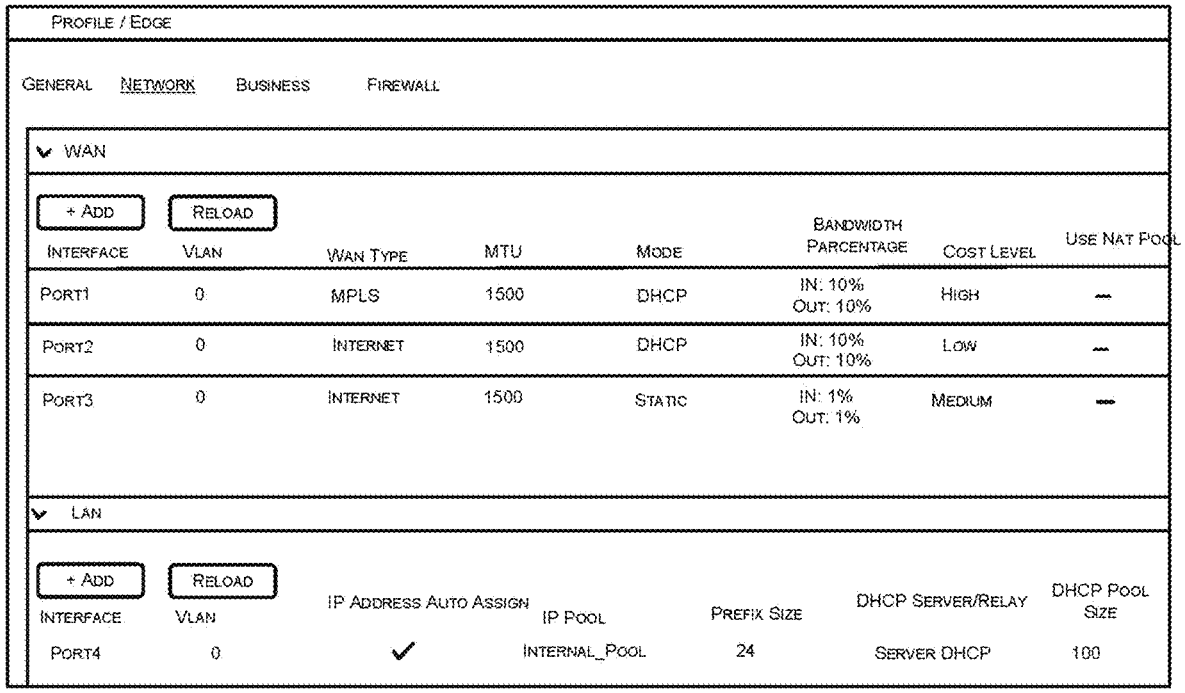

FIG. 4 is a block diagram 400 illustrating an exemplary configuration model to establish network tunnels in accordance with an embodiment of the present invention. In the context of the present example, representation 400, shows a graphical user interface (GUI) view of the SDWAN. Here, a tunnel (e.g., an IPsec tunnel) is established between different groups via WAN ports of respective hub devices using overlay links. At a global view, java objects are represented. At the global view, a device general configuration for an edge device is shown along with a topo underlay port of a hub device. Additionally, a detailed view of connection between multiple devices is illustrated and is illustrated as an underlay link along with a topo connection point, and a topo path. Further, the topo underlay link is shown in detail at a per device view. As shown at the per device view is a device general configuration for the hub, a topo underlay port for the hub, a topo device connection between the hub and the edges, and a topo underlay configuration established on connection of the hub and edge devices of a group.

FIGS. 5A-E illustrate exemplary GUI representations/screen shots 500, 510, 520, 530, and 540 that may be displayed via a management device in accordance with an embodiment of the present invention. With reference to exemplary representation 500, a topology build-up workflow of the SDWAN is shown. The topology for SDWAN is set up by receiving configuration information from a controller. Upon receiving the configuration information, various network devices present at multiple different geographical locations are configured and classified as a group. As an example, a classified group that represents a collection of network devices in Europe are shown, where edge devices are connected to a hub device. Similarly, a classified group representing a collection of network devices in Canada are shown, where edge devices are connected to a hub device. Also, a classified group representing a collection of network devices in United States is shown, where edge devices are connected to a hub device. Further, each of the hub devices of the groups located in Europe, Canada and US are connected to each other via IPsec tunnels. The controller defines the groups based on input from a network administrator, for example, and adds the network devices to the appropriate groups and causes the network devices to establish appropriate tunnels among each other. For example, a network administrator may select a network device via a user interface presented by the controller to specify a role (e.g., edge or hub) for the network device. Based on the specified role of the network devices, the controller can automatically configure appropriate VPN links and IPsec tunnels among the network devices based on their respective roles.

In an embodiment, an exemplary list view representation 510 shows a hostname and IP address of the network devices of the groups (e.g., CN, EU and US). Also shown is the device's status (e.g., online or offline), a serial number of the network device. Further, shown is a profile name and role assigned to the network device.

In an embodiment, an edge profile view 520 displays profile information for a selected edge device and a hub profile view 530 displays profile information for a selected hub device. As shown, edge profile view 520 and hub profile view 530 present details related to a selected edge device and hub device, respectively. The details include information about the interface, VLAN, WAN type, MTU, mode, bandwidth percentage, cost level, use NAT pool of the edge and the hub device. Further, screen 540, is an exemplary list view representation showing global routing information between the connected network devices of the SDWAN.

FIGS. 6A-F illustrate exemplary representations/screen shots 600, 610, 630, 640, 650, and 660 at a network device in accordance with an embodiment of the present invention. With reference to exemplary screen 600, the status, name IP/Netmask, type and access are displayed for the physical interfaces of a selected network device. As noted above, when the network devices participating in the SDWAN are powered on, the network devices obtain an IP address from a controller. Responsive to obtaining the IP address, the network devices obtain DHCP IP and connect to the controller to enable Zero Touch Provisioning (ZTP). Further, the controller receives the network devices' WAN port and assigned IP address and calculates VPN configuration according to their assigned role as an edge or hub and assigned group and pushes the configurations to each of the network devices.

In one embodiment, screen 610 represents an interface through which an administrator can configure the SDWAN interface(s) of a network device, including adding or deleting interfaces (e.g., ports) of the network device, enabling/disabling a particular interface, and assigning a gateway to the particular interface. Further, an exemplary representation at 630 shows performance SLA of the network devices.

At 640, is shown an automatic configuration of a network device with a port. The details of network devices along with the port, subnet and IP details are illustrated. The network devices connect to each other through the ports via VPN channels. Further, at 650 is shown an address group of the network devices. At 660, is shown address groups of the network devices of each of the groups located at different geographical locations.

Figure 7A:
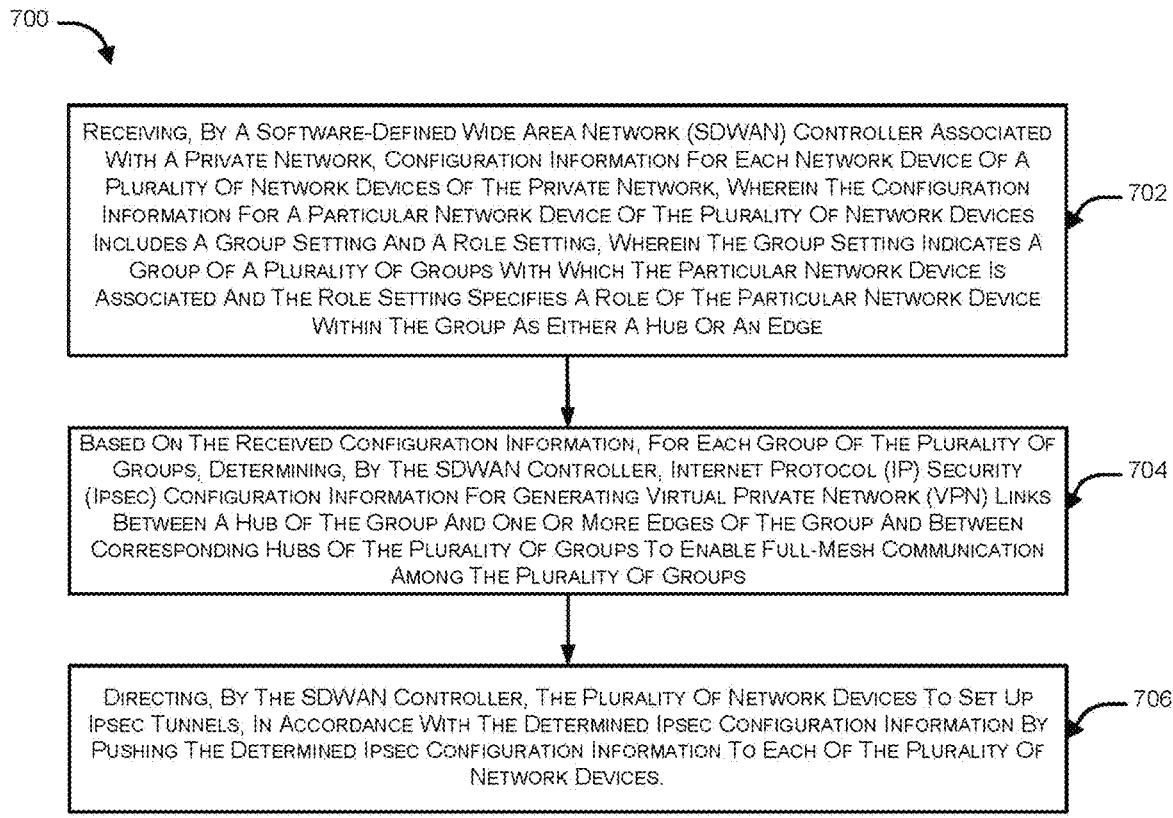
FIG. 7A is a flow diagram illustrating a process performed at an SDWAN controller for establishing full-mesh network communication in accordance with an embodiment of the present invention.

FIG. 7A is a flow diagram 700 illustrating a process performed by an SDWAN controller for establishing full-mesh network communication in accordance with an embodiment of the present invention. The processing described with reference to FIG. 7A may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system 800 described with reference to FIG. 8 below.

In an embodiment, at block 702, an SDWAN controller associated with a private network receives configuration information for each network device of the private network. In one embodiment, the configuration information for a particular network device includes a group setting and a role setting. The group setting indicates a group with which the particular network device is associated and the role setting specifies a role of the particular network device within the group as either a hub or an edge. Based on the received configuration information, for each group, at block 704, the SDWAN controller determines Internet Protocol (IP) security (IPsec) configuration information for generating Virtual Private Network (VPN) links between a hub of the group and one or more edges of the group and between corresponding hubs of the various groups so as to enable full-mesh communication among the various groups. Further, at block 706 the SDWAN controller can direct the various network devices to set up the IPsec tunnels. The IPsec tunnels can be set up in accordance with the determined IPsec configuration information by pushing the determined IPsec configuration information to each network device of the various network devices.

Figure 7B:
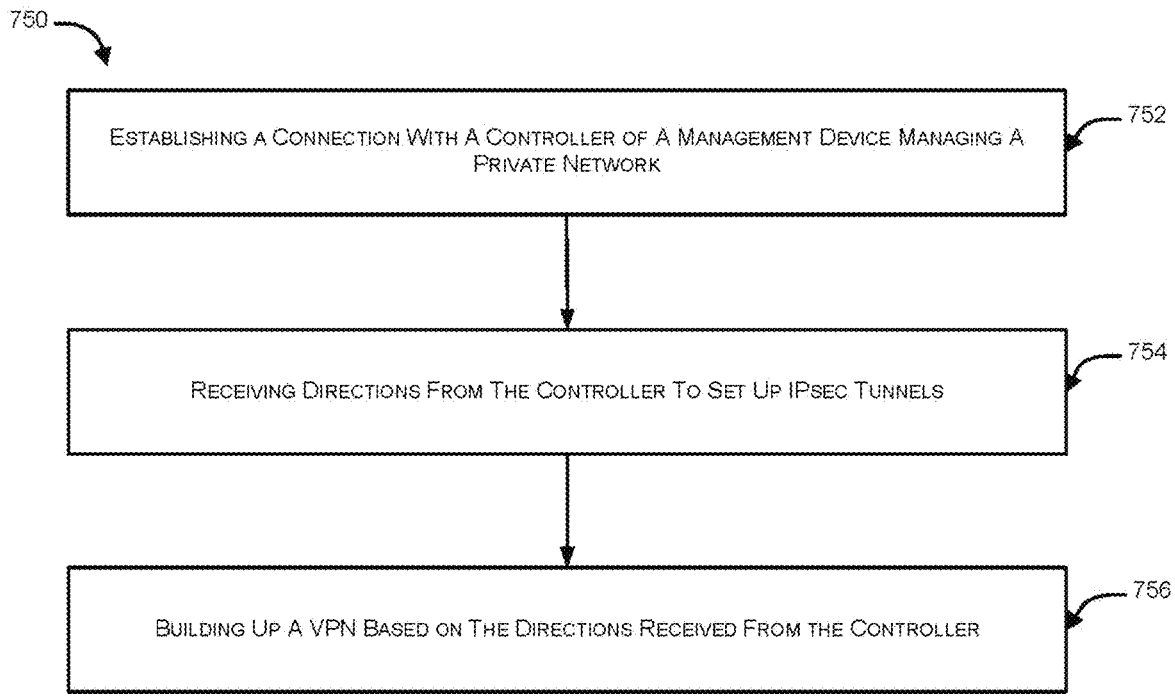
FIG. 7B is a flow diagram illustrating a process performed at a network device for establishing full-mesh network communication in accordance with an embodiment of the present invention.

FIG. 7B is a flow diagram 750 illustrating a process performed at each network device participating within an SDN for establishing full-mesh network communication in accordance with an embodiment of the present invention. As above, the processing described with reference to FIG. 7B may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system 800 described with reference to FIG. 8 below.

In an embodiment, at block 752 a connection of a network device with an SDN controller (e.g., controller 104) of a management device (e.g., management device 102) that manages the network devices of a private network is established. At block 754, responsive to establishment of the connection between the network device and the SDN controller, directions are received from the controller to set up IPsec tunnels. The IPsec tunnels are set up in accordance with the determined IPsec configuration information that are pushed to the network device from the SDN controller. Further, at block 756 a VPN is built based on directions received from the controller to facilitate full mesh communication within an enterprise based on group and role settings of the network device. The VPN is generated between a hub of the group and one or more edges of the group and between corresponding hubs of the groups to enable full-mesh communication among the multiple groups.

Figure 8:
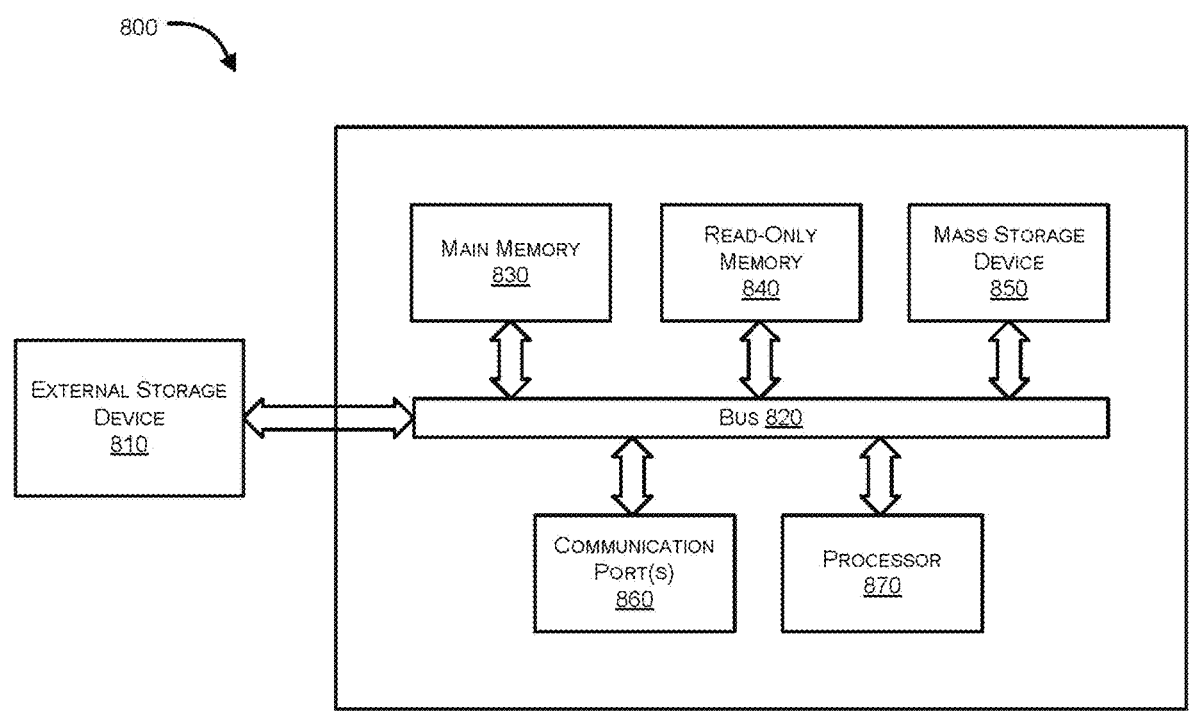
FIG. 8 illustrates an exemplary computer system in which or with which embodiments of the present invention may be utilized.

FIG. 8 illustrates an exemplary computer system 800 in which or with which embodiments of the present invention can be utilized. As shown in FIG. 8, computer system includes an external storage device 810, a bus 820, a main memory 830, a read only memory 840, a mass storage device 850, a communication port 860, and a processor 870. In one embodiment, computer system 800 may represent some portion of a network device (e.g., edge devices 112-1, 112-2, . . . 112-N or hub devices 110-1, 110-2 and 110-3 of FIG. 1A-1B) or a management device (e.g., management device 102) implementing an SDN controller.

Those skilled in the art will appreciate that computer system 800 may include more than one processor 870 and communication ports 860. Examples of processor 870 include, but are not limited to, an Intel® Itanium® or Itanium 2 processor(s), or AMD® Opteron® or Athlon MP® processor(s), Motorola® lines of processors, Forti-SOC™ system on a chip processors or other future processors. Processor 870 may include various modules associated with embodiments of the present invention.

Communication port 860 can be any of an RS-232 port for use with a modem based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system connects.

Memory 830 can be Random Access Memory (RAM), or any other dynamic storage device commonly known in the art. Read only memory 840 can be any static storage device(s) e.g., but not limited to, a Programmable Read Only Memory (PROM) chips for storing static information e.g. start-up or BIOS instructions for processor 870.

Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g. a display, keyboard, and a cursor control device, may also be coupled to bus 820 to support direct operator interaction with computer system. Other operator and administrative interfaces can be provided through network connections connected through communication port 860. External storage device 810 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
receiving, by a Software-Defined Wide Area Network (SDWAN) controller associated with a private network of an organization, configuration information for each network device of a plurality of network devices of the private network, wherein the configuration information for a particular network device of the plurality of network devices includes a group setting and a role setting, wherein the group setting indicates a group of a plurality of groups with which the particular network device is associated and the role setting specifies a role of the particular network device within the group as either a hub or an edge, wherein a first group of the plurality of groups includes a first subset of the plurality of network devices located at a first physical site of the organization and a second group of the plurality of groups includes a second subset of the plurality of network devices located at a second physical site of the organization;

based on the received configuration information, for each group of the plurality of groups, determining, by the SDWAN controller, Internet Protocol (IP) security (IPsec) configuration information for establishment of Virtual Private Network (VPN) links between a hub of the group and one or more edges of the group; and enabling, by the SDWAN controller, full-mesh communication among the plurality of groups by causing the hubs of the plurality of groups to set up IPsec tunnels between each pair of the hubs in accordance with the determined IPsec configuration information by pushing the determined IPsec configuration information to the hubs.

2. The method of claim 1, wherein the plurality of network devices comprise network security devices and wherein the SDWAN controller is implemented within a management appliance that manages the plurality of network devices.

3. The method of claim 1, wherein when a network device of the plurality of network devices is powered on, the network device receives a dynamically assigned IP address from a cloud to establish a network connection with the SDWAN controller.

4. The method of claim 1, wherein the plurality of network devices establish a VPN in response to direction received from the SDWAN controller.

5. The method of claim 1, wherein the IPsec tunnels are established using any or a combination of Multiprotocol Label Switching (MPLS) links and Internet links.

6. The method of claim 1, wherein the plurality of network devices represent consumer premises equipment (CPE).

7. The method of claim 3, wherein the IPsec configuration information is determined based on a WAN port IP address received from the network device on establishment of the network connection with the SDWAN controller.

8. The method of claim 3, wherein the IP address is assigned using Dynamic Host Configuration Protocol (DHCP).

9. A Software-Defined Wide Area Network (SDWAN) controller comprising:
a processing resource; and
a non-transitory computer-readable medium, coupled to the processing resource, having stored therein instructions that when executed by the processing resource cause the processing resource to:
receive configuration information for each network device of a plurality of network devices of a private network of an organization, wherein the configuration information for a particular network device of the plurality of network devices includes a group setting and a role setting, wherein the group setting indicates a group of a plurality of groups with which the particular network device is associated and the role setting specifies a role of the particular network device within the group as either a hub or an edge, wherein a first group of the plurality of groups includes a first subset of the plurality of network devices associated with a first physical site of the organization and a second group of the plurality of groups includes a second subset of the plurality of network devices associated with a second physical site of the organization;

based on the received configuration information, for each group of the plurality of groups, determine Internet Protocol (IP) security (IPsec) configuration information for establishment of Virtual Private Network (VPN) links between a hub of the group and one or more edges of the group enable full-mesh communication among the plurality of groups by causing the hubs of the plurality of groups to set up IPsec tunnels between each pair of the hubs in accordance with the determined IPsec configuration information by pushing the determined IPsec configuration information to the hubs.

10. The SDWAN controller of claim 9, wherein the plurality of network devices comprise network security devices and wherein the SDWAN controller is implemented within a management appliance that manages the plurality of network devices.

11. The SDWAN controller of claim 9, wherein when a network device of the plurality of network devices is powered on, the network device receives a dynamically assigned IP address from a cloud to establish a network connection with the SDWAN controller.

12. The SDWAN controller of claim 9, wherein the instructions further cause the SDWAN controller to cause the plurality of network devices to establish a VPN.

13. The SDWAN controller of claim 9, wherein the IPsec tunnels are established using one or more of Multiprotocol Label Switching (MPLS) links and Internet links.

14. The SDWAN controller of claim 11, wherein the IPsec configuration information is determined based on a WAN port IP address received from the network device on establishment of the network connection with the SDWAN controller.

15. The SDWAN controller of claim 11, wherein the IP address is assigned using Dynamic Host Configuration Protocol (DHCP).

16. A non-transitory computer-readable storage medium embodying a set of instructions, which when executed by a processing resource of a Software-Defined Wide Area Network (SDWAN) controller, causes the processing resource to:

receive configuration information for each network device of a plurality of network devices of a private network of an organization, wherein the configuration information for a particular network device of the plurality of network devices includes a group setting and a role setting, wherein the group setting indicates a group of a plurality of groups with which the particular network device is associated and the role setting specifies a role of the particular network device within the group as either a hub or an edge, wherein a first group of the plurality of groups includes a first subset of the plurality of network devices associated with a first physical site of the organization and a second group of the plurality of groups includes a second subset of the plurality of network devices associated with a second physical site of the organization;

based on the received configuration information, for each group of the plurality of groups, determine Internet Protocol (IP) security (IPsec) configuration information for establishment of Virtual Private Network (VPN) links between a hub of the group and one or more edges of the group; and enable full-mesh communication among the plurality of groups by causing the hubs of the plurality of groups to set up IPsec tunnels between each pair of the hubs in accordance with the determined IPsec configuration information by pushing the determined IPsec configuration information to the hubs.

17. The non-transitory computer-readable storage medium of claim 16, wherein the plurality of network devices comprise network security devices and wherein the SDWAN controller is implemented within a management appliance that manages the plurality of network devices.

18. The non-transitory computer-readable storage medium of claim 16, wherein when a network device of the plurality of network devices is powered on, the network device receives a dynamically assigned IP address from a cloud to establish a network connection with the SDWAN controller.

19. The non-transitory computer-readable storage medium of claim 18, wherein the IPsec configuration information is determined based on a WAN port IP address received from the network device on establishment of the network connection with the SDWAN controller.

20. The non-transitory computer-readable storage medium of claim 18, wherein the IP address is assigned using Dynamic Host Configuration Protocol (DHCP).

* * * * *